United States Patent Office 3,147,416
Patented Sept. 1, 1964

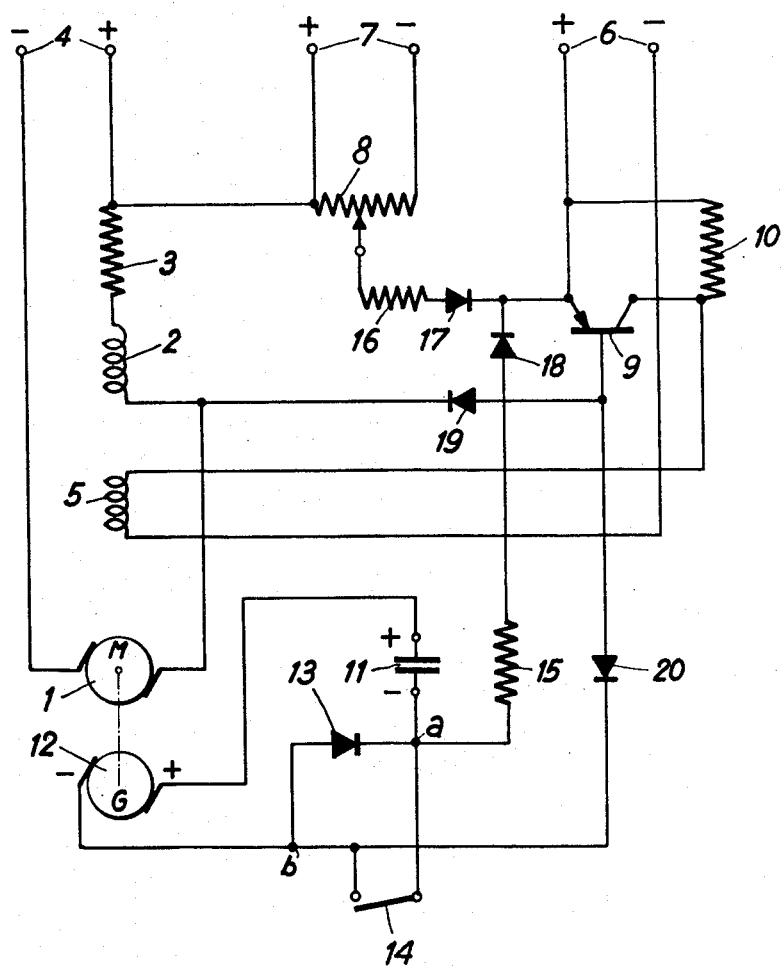

3,147,416
MOTOR CONTROL ARRANGEMENT
Heinrich Grünbaum, Bollwerkstrasse 18,
Binningen, Basel-Land, Switzerland
Filed Apr. 2, 1962, Ser. No. 184,069
Claims priority, application Switzerland June 15, 1961
7 Claims. (Cl. 318—6)

The present invention concerns an arrangement for driving a take-up reel on which material is wound that is being furnished continuously from a production machine, as for instance textiles, rubber, paper, synthetic foils, cables or the like. Here below all these and other materials will be called generically "reeling material". More particularly the invention concerns a control arrangement for regulating a direct current motor which drives the take-up reel.

It is customary to use for this purpose direct current motors the excitation whereof depends directly upon the armature current. Since it is desirable to keep the tension in the reeling material constant during the reeling operation, and since the diameter of the coil of the material being reeled steadily increases, it is necessary to decrease the initial rotary speed of the take-up reel or of the motor in reverse proportion to the increasing diameter of the coil so that the energy output of the motor remains also constant. For this purpose it is advantageous to carry out the regulation of the motor speed, i.e. its continuous decrease by means of a corresponding increase of the excitation.

If the speed regulation of the motor is carried out in this manner its armature current remains constant and is at the same time always indicative of the tension set up in the reeling material by the torque produced by the motor. Consequently, the regulation is effected by monitoring the armature current in such a manner that an increase of this current beyond a predetermined reference value causes an increase of the excitation. This can be done in various ways, the excitation being kept in direct proportion to the magnitude of the armature current.

One of the disadvantages of the system is due to the fact that the rotary speed of the motor and of the take-up reel increases whenever the armature current unexpectedly decreases. This may occur whenever the supply of reeling material to the take-up reel is interrupted, for instance when the tail end of the reeling material being reeled leaves the production machine, or if during the reeling process the reeling material should break between the production machine and the take-up reel. However, in such cases it is usually desirable that the rotation of the motor or of the take-up reel is maintained at that speed which existed at the moment when the supply of reeling material was interrupted, because in this case it is possible for the operator to place the forward end of another length of reeling material on the so far produced coil thereof for continuing the reeling operation.

A further disadvantage of known regulating systems of this kind, so-called "proportional regulators," is due to the fact that a predetermined amount of excitation is associated with a predetermined amount of deviation of the armature current from a certain reference value thereof. However, since only very small increases of the armature current beyond the predetermined reference value is permissible in the interest of maintaining a constant tension in the reeling material, amplifier means in the regulating apparatus must have a very high amplification factor so that a full excitation of the motor can be obtained already upon a very small percentual increase of the armature current beyond the reference value. This renders the regulating system extremely sensitive which leads to oscillations or hunting, a condition which is even assisted by the fact that in a reeling operation a thus wound coil on the take-up reel usually has its center of gravity spaced from the axis of rotation causing an unbalance which tends to initiate the oscillation or hunting.

It is therefore one of the objects of this invention to provide for a direct current motor driving a take-up reel a control ararngement which automatically maintains the motor at its speed existing when a previously existing load on the motor disappears.

It is a further object of this invention to provide for a motor as mentioned above a control arrangement which avoids the development of oscillations or hunting.

It is another object of this invention to provide for a control arrangement which avoids both the above mentioned disadvantages.

It is still another object of this invention to provide for a control arrangement as set forth which is comparatively simple in structure and entirely reliable in operation.

With above objects in view the invention includes a control arrangement for a direct current motor having at least one separate-exciter winding and driving a take-up reel, for automatically regulating the motor speed in reverse proportion to the increase of the diameter of the coil of material being reeled, comprising, in combination, first circuit means supplying direct current to the motor armature and including first resistance means developing a voltage drop thereacross varying in proportion to the load current of the motor which current varies with the change of the diameter of the material coil being reeled; second circuit means including a source of predetermined voltage for energizing the separate-exciter winding and including second resistance means permitting only a fraction of said voltage to be applied to said exciter winding, and controllable switch means including a control circuit and being connected in parallel with said second resistance means, said switch means being changeable, by application of a control voltage to said control circuit, between a first substantially non-conductive condition in which said second resistance means are rendered effective, and a second conductive condition in which said second resistance means are shunted and said voltage is applied to said exciter winding; and comparator circuit means connected between said control circuit of said switch means and said first resistance means and including a source of predetermined reference voltage, for comparing said reference voltage with said voltage drop across said first resistance means and for applying an existing voltage difference therebetween as said control voltage to said control circuit of said switch means so as to render the latter conductive as long as said voltage drop exceeds said reference voltage.

In another aspect of this invention there is provided a control arrangement for a direct current motor having at least one separate-exciter winding and driving a take-up reel at speeds decreasing with the increase of the diameter of the coil of material being reeled, for automatically maintaining the motor at its speed existing when a previously existing load on the motor disappears, particularly in the case of a break of the material being reeled, comprising, in combination, circuit means including a source of predetermined voltage for energizing the separate-exciter winding and including resistance means permitting only a fraction of said voltage to be applied to said exciter winding, and controllable switch means including a control circuit and being connected in parallel with said resistance means, said switch means being changeable, by application of a control voltage to said control circuit, between a first substantially non-conductive condition in which said resistance means are rendered effective, and a second conductive condition in which said resistance means are shunted and said voltage is applied to said exciter winding; generator means coupled with the motor for producing an output voltage in proportion to the motor speed; auxiliary circuit means connected between the output of said generator and said control circuit of said switch means and including capacitor means arranged to be charged by said output voltage in proportion to a maximum motor speed reached upon a first increase thereof after its start, to discharge across said generator when the motor speed thereafter decreases from said maximum speed to a slower operational speed, and to be charged again, when the motor speed thereafter undergoes a repeated increase from a given operational speed, across said control circuit so as to apply said control voltage thereto and to render said switch means conductive whenever such repeated speed increase beyond the operational speed existing before such increase occurs, whereby through energization of said exciter winding by said voltage the motor is returned to the operational speed existing before said repeated increase thereof.

In still another aspect of this invention there is provided a control arrangement for a direct current motor having at least one separate-exciter winding and driving a take-up reel, for automatically regulating the motor speed in reverse proportion to the increase of the diameter of the coil of material being reeled, and for automatically maintaining the motor at its previously regulated speed existing when the load on the motor disappears, particularly in the case of a break of the material being reeled, comprising, in combination, first circuit means supplying direct current to the motor armature and including first resistance means developing a voltage drop thereacross varying in proportion with the load current of the motor which current varies with the change of the diameter of the material coil being reeled; second circuit means including a source of predetermined voltage for energizing the separate-exciter winding and including second resistance means permitting only a fraction of said voltage to be applied to said exciter winding, and controllable switch means including a control circuit and being connected in parallel with said second resistance means, said switch means being changeable between a substantially non-conductive condition in which said second resistance means is rendered effective, and a second conductive condition in which said second resistance means is shunted and said voltage is applied to said exciter winding; comparator circuit means connected between said control circuit of said switch means and said first resistance means and including a source of predetermined reference voltage, for comparing said reference voltage with said voltage drop across said first resistance means and for applying an existing voltage difference therebetween as said control voltage to said control circuit of said switch means so as to render the latter conductive as long as said voltage drop exceeds said reference voltage; generator means coupled with the motor for producing an output voltage in proportion to the motor speed; auxiliary circuit means connected between the output of said generator and said control circuit of said switch means and including capacitor means arranged to be charged by said output voltage in proportion to a maximum motor speed reached upon a first increase thereof after its start, to discharge across said generator when the motor speed thereafter decreases from said maximum speed to a slower operational speed, and to be charged again, when the motor speed thereafter undergoes a repeated increase from a given operational speed, across said control circuit so as to apply said control voltage thereto and to render said switch means conductive whenever such repeated speed increase beyond the operational speed existing before such increase occurs, whereby through energization of said exciter winding by said voltage the motor is returned to the operation speed existing before said repeated increase thereof.

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawing which illustrates by way of example a circuit diagram of a control arrangement according to the invention.

A direct current motor M has an armature 1 and two exciter windings of which winding 2 is connected in series with a resistor 3 in the supply cricuit of the armature, this supply circuit being connected at 4 with a source of direct current with the polarities as indicated in the drawing. A second winding 5 is connected at 6 with a separate source of predetermined voltage with the polarities as indicated. Consequently, the winding 2 produces a series exciter field while the winding 5 produces a separate exciter field which acts, as will be shown, like a shunt field. Thus, the motor arrangement shown is equivalent to a compound motor arrangement. A source of reference voltage is connected, with the indicated polarity, with the terminals 7 of a potentiometer 8 which serves to adjust the reference voltage to a desired value. The positive terminal of the potentiometer 8 is connected with one end of the series combination of winding 2 and resistor 3 in the positive input line for the armature 1.

The connection for the separate exciter winding 5 with the terminals 6 contains a resistor 10 which serves to reduce the voltage available at the terminals 6 to a desirable smaller value. However, a switch device 9 is provided which is connected in parallel with the resistor 10 and is normally non-conductive. Whenever it is rendered conductive the resistor 10 is shunted so that in this case the full amount of the voltage available at the terminals 6 is applied to the separate exciter winding 5.

Preferably, however, the device 9 is not only a switch means but at the same time an amplifier for amplifying the voltage available at the terminals 6. Therefore, the device 9 may be a magnetic amplifier or an electronic amplifier as for instance a transistor, a thyratron, a tunnel diode or the like. In the present example the device 9 is a transistor. The movable tap of the potentiometer 8 is connected, preferably across a resistor 16, with the emitter of the transistor 9, the emitter-collector circuit whereof is connected in parallel with the resistor 10, while the emitter-base circuit is connected with the other end of the above mentioned series-combination of winding 2 and resistor 3.

The operation of this portion of the arrangement according to the invention will be described further below.

The amplifier and switch device 9 is also connected in a second regulating circuit according to the invention. A generator of the tachometer type has its armature 12 mechanically coupled with the armature 1 of the motor M so as to rotate conjointly therewith. Consequently, the generator G always produces an output voltage which is in proportion with the speed of the motor M. The terminals of the generator G with the polarities shown, are connected with a capacitor 11 via a diode 13 having terminals $a$ and $b$ and being so arranged that the capacitor 11 cannot be charged by the output voltage of generator G to the polarities indicated at the capacitor 11. However when the capacitor 11 is charged to a voltage which is higher than the output voltage of the generator G, then the capacitor can discharge across the diode 13 until the charge of the capacitor 11 is again equal to the existing output voltage of the generator G. A normally open switch 14 is connected in parallel with the diode terminals $a$ and $b$. When switch 14 is closed, the output voltage of generator G is applied directly to the capacitor 11 so as to charge the latter to the output voltage of the generator G. In addition, the emitter-phase circuit of the transistor 9 is also connected, with the interposition of a resistor 15, in parallel with the diode terminals $a$ and $b$.

Additional diodes 17, 18, 19 and 20 are arranged within the above described circuits in order to prevent the flow of current in undesirable directions.

The operation of this portion of the circuit arrangement according to the invention will also be described further below. The source of electric energy which applies direct current to the terminals 4 may be a direct current generator. It may be a Ward-Leonard-generator which feeds also the motors of the production machine that furnishes the reeling material, or a separate generator which is driven indirectly by the production machine. In both cases the motor M is supplied with a direct current voltage proportional to the actual operating speed of the production machine i.e. to the travelling speed of the reeling material supplied thereby. Consequently, the basic speed of the motor M will always correspond to the existing speed of supply of the reeling material. In most cases this speed may vary within a range of 1:10 so that one may assume that the voltage available at the terminals 4 may vary from case to case between 22 and 220 volts.

The magnitude of the voltage to be applied at the terminals 6 depends upon the type of amplifier used in the device 9. If the latter is a germanium transistor then about 60 volts will be suitable. The reference voltage applied at the terminals 7, in this example, would be about 5 volts. The sources for the last mentioned two voltages need not be absolutely independent ones but these voltages may be derived through suitable conventional means from the source which furnishes the voltage applied to the terminals 4.

For example, if it is assumed that at maximum desired tension in the reeling material and at maximum production speed 220 volts are applied at the terminals 4 and an energy output of 1.75 kw. is required, then the motor M will draw from the supply source an energy of about 2.2 kw. or a current of 10 amps. This current flows through the armature 1 and produces in the series-combination 2, 3 a voltage drop in proportion to the current. If for instance the winding 2 has a resistance of .1 ohm and the resistor 3 has a resistance .4 ohm, then this voltage drop would amount to 5 volts.

It can be seen that the series-combination 2, 3 and the potentiometer 8 together with the transistor 9 are components of a comparator circuit. In the above example, the voltage drop of 5 volts is applied with negative potential to the base of the transistor 9. Assuming that the movable tap of the potentiometer 8 were positioned at the right-hand end of the potentiometer 8, then the reference voltage of 5 volts is applied with negative potential to the emitter of the transistor 9. As long as the emitter potential is equal or less than the base potential the transistor 9 is non-conductive. Should however the armature current flowing through the series-combination 2, 3 increase then the voltage drop would increase accordingly and the base of transistor 9 would become more negative whereby the transistor 9 is rendered conductive. Consequently, since the full reference voltage of 5 volts is equal to the voltage drop of 5 volts appearing when an armature current of 10 amps flows, the regulator arrangement will maintain the armature current constant at 10 amps because any tendency of the armature current to increase is responded to by the application, through shunting of the resistor 10, of increased excitation by winding 5 which slows down the motor. Thus in the course of reeling the increase of diameter of the coil of material is taken into account by reducing the speed of the motor by keeping the armature current constant although the torque steadily increases.

Sometimes it is desirable to wind the reeling material more loosely e.g. with a tension only one-tenth of the maximum tension mentioned above. Since, as stated at the outset, the armature current is indicative of the tension set up in the reeling material, in this case a smaller armature current has to be maintained throughout the reeling operation. Consequently, in such case the movable tap of the potentiometer 8 the entire resistance whereof may be 300 ohms, is moved close to the left- hand end of the potentiometer 8 where a negative potential of only .5 volt is available. With this adjusted reference voltage an armature current in the motor M of only 1 amp is obtained because with this current the voltage drop across the series-combination 2, 3 would amount only to .5 volt.

The operation of the arrangement according to the invention is as follows.

As far as the first portion of the regulating arrangement is concerned, it will be understood that whenever the diameter of the coil of reeling material increases even a slight amount the torque to be furnished by the motor increases whereby the latter is slowed down and the armature current is bound to increase. This results in an increase of the voltage drop across the series-combination 2, 3 so that this voltage drop exceeds the reference voltage adjusted by the potentiometer 8. This causes immediately an emitter-base current which renders the emitter-collector circuit of the transistor 9 conductive so that the resistor 10 is shunted. Immediately the current through separate exciter coil 5 and the corresponding field is increased. This results in a reduction of the armature current and in a decrease of the voltage drop across the series-combination 2, 3 to a value smaller than the adjusted reference voltage in the potentiometer 8. Hereby the transistor 9 is again rendered non-conductive whereby the excitation by the winding 5 is decreased. This causes again an increase of the armature current and of the corresponding voltage drop across 2, 3. Thus the above cycle repeats. As a whole there can be observed a periodic fluctuation of the armature current slightly above and below the desired constant value thereof as determined by the adjusted reference voltage in the potentiometer 8. The frequency of these fluctuations depends upon the time constant of the exciter-winding 5. As a rule this frequency will be of the order of 10 cycles per second. In view of the trigger-type operation of the transistor 9 one would expect that the current form would appear in a diagram like rectangular pulses with sharp corners. However since the winding 5 has a delaying action the sharp corners mentioned above would be rounded.

As long as the diameter of the coil wound on the take-up reel is still rather small and therefore the speed of the motor comparatively high, then the duration of the conductivity periods of the transistor is considerably smaller than the duration of the non-conductivity periods. As the reeling operation continues, this ratio changes continuously toward a reverse condition so that near the end of the reeling operation the winding 5 is energized almost continuously with only brief interruptions.

The positive and negative deviations of the armature current from a desired value determined by the setting of the potentiometer 8 are very small because by suitably selecting the parameters of the amplifier and switch device 9 one can easily arrange for the device 9 to be rendered conductive by the application of a control voltage of 5.01 volts and to be rendered non-conductive upon the application of a control voltage of 4.99 volts. Consequently the accuracy of the arrangement amounts to ±.2%.

It is to be admitted that this accuracy cannot be obtained with only one single transistor 9 as shown for the sake of simplification in the drawing. Instead a group of amplifiers comprising at least three transistors would have to be used so that the entire current amplification is better than 1:100,000. However, this does not mean any departure from the fundamental idea underlying this arrangement according to the invention. The device 9 illustrated in the drawing has to be interpreted as an amplifier and switch arrangement of any suitable type having a very small time constant and furnishing the desired high amplification.

Under such conditions the resistors 15 and 16 may be chosen with a resistance value of 2000 ohms each so that, when the voltage drop across 2, 3 differs from the reference voltage at the potentiometer 8 an amount of .02 volt, a control current of 10 microamperes is applied to the device 9 which would be sufficient for producing the flow of an exciter current of 1.2 amps through the winding 5. This would be the above mentioned current for fully exciting the winding 5 when the resistor 10 is shunted. Assuming that the winding 5 has a resistance of 50 ohms then the resistor 10 would have to have a resistance of about 250 ohms in order to obtain a reduction of the field from its maximum value to one-sixth thereof when the transistor 9 is not conductive, provided that the change takes place along the rectilinear portion of the magnetization characteristic. Such a reduction of the magnet field is necessary if the diameter of the coil of material changes during the reeling operation in a proportion of 1:6, i.e. for instance increases from 4″ to 24″. This would mean that the maximum motor speed used at the start of the reeling operation has to be six times its magnitude at the end of the reeling operation.

It should be noted that the series-exciter winding 2 is only provided in order to stabilize the operation of the motor i.e. avoid oscillations thereof which otherwise might occur in view of the very considerable reduction of the excitation through winding 5 as required by a great range of variation of the coil diameter as indicated in the above described example.

However, if the diameter of a completed coil of reeling material does not exceed four times the diameter of the first turn of the coil, then the series-winding 2 is not required and the motor will be operated only by means of the separate exciter winding 5. In this case the voltage drop which is compared with the adjusted reference voltage at the potentiometer 8 is the voltage drop across the resistor 3.

Referring now to the second portion of the arrangement according to the invention, it will be understood that the generator G coupled with the motor M produces at the brushes of the armature 12 an output voltage which is proportional to the rotary speed of the motor M, e.g. 60 volts at a speed of 1000 r.p.m. Should for any reason an alternating current generator be used then it must be combined with a rectifier in order to obtain a direct current output voltage. From the diagram it can be seen that the capacitor 11 can be charged by the generator G as its output voltage increases only in one of two ways:

(a) Directly and rapidly via the switch 14 when the latter is in closed position.

(b) slowly via resistor 15, diode 18, the emitter-base circuit of the transistor 9, diode 20 and back to the negative terminal of the generator G.

Whenever during the operation the output voltage of the generator G decreases, the capacitor 11 discharges directly and rapidly via diode 13 to the positive terminal of the generator G.

When the motor M is connected by switch means not shown with the source of energy furnishing the input voltage to the terminals 4 the motor accelerates to a predetermined comparatively high speed which is necessary for starting to reel the reeling material furnished by a production machine at a certain speed on the take-up reel having a given basic diameter. Conventional means for adjusting and limiting this initial high speed of the motor to a desired value are not shown because they do not constitute part of this invention.

While the motor M accelerates as mentioned above the generator G produces a correspondingly increasing output voltage which reaches its maximum when the motor reaches the desired maximum initial speed. In order to quickly charge the capacitor 11 with this maximum output voltage the switch 14 is kept in closed position during this starting period of the motor M. The switch 14 may be operated manually, but it is advisable to use a time relay containing the switch 14 as relay contact and actuated upon start of the motor M and automatically opening the switch 14 at the time when the starting period of the motor is completed.

As during the reeling operation the speed of the motor M continuously decreases as mentioned above, also the output voltage of the generator G decreases. As this takes place the capacitor 11 continuously discharges across the generator armature 12 and the diode 13.

If however, during the course of the reeling operation the supply of reeling material is interrupted e.g. by a break of the reeling material between the production machine and the take-up reel, the load on the motor likewise disappears suddenly and the motor will have the tendency of greatly increasing its speed, because its armature current decreases and the corresponding voltage drop across the series-combination, 2, 3 causes the transistor 9 to remain in non-conductive condition.

However, as soon as the rotary speed of the motor and of the generator increases by an amount of one-third r.p.m., the output voltage at the brushes of the armature 12 increases and is .02 volt higher than the existing charge potential of the capacitor 11. Since now the switch 14 is in open position, the increase of output voltage can now charge the capacitor 11 only via the emitter-base circuit of the transistor 9. As stated above the emitter-base current would amount to 10 microamperes in view of the resistance of 2000 ohms of the resistor 15. However, this small current is sufficient for rendering the transistor 9 conductive and thereby causing an immediate increase of the energization of the exciter winding 5. Hereby the speed of the motor is again reduced, the output voltage of the generator G drops below the charge potential of the capacitor 11 and the transistor 9 is again rendered non-conductive. This cycle repeats and a periodic fluctuation of the motor speed develops with an amplitude of ⅓ r.p.m. and with a frequency which depends only on the inertia of the motor armature. During these fluctuations of the speed the capacitor potential changes periodically .01 volt.

Since the variation of the potential is not exactly sinusoidal gradually a slow charging or a slow discharging of the capacitor may occur. In order to provide for a sufficiently large time for the change of the charged condition it is advisable to select for the capacitor 11 a capacity of ample magnitude, about 200 to 500 microfarad. The result of this last described regulating operation is the maintenance of the motor speed at that value which it had at the moment when the load on the motor suddenly disappeared, because the varying output voltage of the generator G is continuously compared with its previously existing value which is still available in the capacitor 11.

From the above described operation of the amplifier 9 it can be seen that it operates according to the trigger-principle and the regulation carried out thereby is a "two-point" regulation which entails a great accuracy and safely avoids the above mentioned fluctuations of the tension in the reeling material which are so very dangerous in reeling operations.

Summing up, it can be seen that the arrangement of the capacitor 11 as described permits to keep the motor speed at that value which it had at the moment when the load on the motor suddenly disappeared.

For the sake of completeness it may be added that the electronic amplifier 9 has mainly the function of a switch however together with a high degree of amplification. In the case that a thyratron is used then the negative terminal of the capacitor 11 will be connected with the cathode, and the negative terminal of the generator G will be connected with the control grid.

It will be understood that each of the elements described above or two or more together, may also find a useful application in other types of a control arrangement for a direct current motor driving a take-up reel differing from the types described above.

While the invention has been illustrated and described as embodied in a control arrangement for a direct current motor driving a take-up reel, for automatically regulating the motor speed in proportion to the diameter of the coil of material being reeled, and for automatically maintaining the motor at a speed existing when the load on the motor disappears, it is not intended to be limited to the details shown, since various modifications and structural changes may be made without departing in any way from the spirit of the present invention.

Without further analysis the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore such adaptations should and are intended to be comprehended within the meaning and range of equivalence of the following claims.

What is claimed and desired to be secured by Letters Patent is:

1. A control arrangement for a direct current motor having at least one separate-exciter winding and driving a take-up reel, for automatically regulating the motor speed in reverse proportion to the increase of the diameter of the coil of material being reeled, and for automatically maintaining the motor at its previously regulated speed existing when the load on the motor disappears, particularly in the case of a break of the material being reeled, comprising, in combination, first circuit means supplying direct current to the motor armature and including first resistance means developing a voltage drop thereacross varying in proportion with the load current of the motor which current varies with the change of the diameter of the material coil being reeled; second circuit means including a source of predetermined voltage for energizing the separate-exciter winding and including second resistance means permitting only a fraction of said voltage to be applied to said exciter winding, and controllable switch means including a control circuit and being connected in parallel with said second resistance means, said switch means being changeable between a substantially non-conductible condition in which said second resistance means is rendered effective, and a second conductive condition in which said second resistance means is shunted and said voltage is applied to said exciter winding; comparator circuit means connected between said control circuit of said switch means and said first resistance means and including a source of predetermined reference voltage, for comparing said reference voltage with said voltage drop across said first resistance means and for applying an existing voltage difference therebetween as said control voltage to said control circuit of said switch means so as to render the latter conductive as long as said voltage drop exceeds said reference voltage; generator means coupled with the motor for producing an output voltage in proportion to the motor speed; auxiliary circuit means connected between the output of said generator and said control circuit of said switch means and including capacitor means arranged to be charged by said output voltage in proportion to a maximum motor speed reached upon a first increase thereof after its start, to discharge across said generator when the motor speed thereafter decreases from said maximum speed to a slower operational speed, and to be charged again, when the motor speed thereafter undergoes a repeated increase from a given operational speed, across said control circuit so as to apply said control voltage thereto and to render said switch means conductive whenever such repeated speed increase beyond the operational speed existing before such increase occurs, whereby through energization of said exciter winding by said voltage the motor is returned to the operational speed existing before said repeated increase thereof.

2. A control arrangement for a direct current motor having at least one separate-exciter winding and driving a take-up reel, for automatically regulating the motor speed in reverse proportion to the increase of the diameter of the coil of material being reeled, and for automatically maintaining the motor at its previously regulated speed existing when the load on the motor disappears, particularly in the case of a break of the material being reeled, comprising, in combination, first circuit means supplying direct current to the motor armature and including a series-exciter winding and first resistance means forming together a series-combination developing a voltage drop thereacross varying in proportion with the load current of the motor which current varies with the change of the diameter of the material coil being reeled; second circuit means including a source of predetermined voltage for energizing the separate-exciter winding and including second resistance means permitting only a fraction of said voltage to be applied to said exciter winding, and controllable amplifier means including a control circuit and being connected in parallel with said second resistance means, said amplifier means being changeable between a substantially non-conductive condition in which said second resistance means is rendered effective, and a second conductive and amplifying condition in which said second resistance means is shunted and said voltage is applied in amplified form to said exciter winding; comparator circuit means connected between said control circuit of said amplifier means and said series-combination and including a source of predetermined reference voltage, for comparing said reference voltage with said voltage drop across said series-combination and for applying an existing voltage difference therebetween as said control voltage to said control circuit of said amplifier means so as to render the latter conductive as long as said voltage drop exceeds said reference voltage; generator means coupled with the motor for producing an output voltage in proportion to the motor speed; auxiliary circuit means connected between the output of said generator and said control circuit of said amplifier means and including capacitor means arranged to be charged by said output voltage in proportion to a maximum motor speed reached upon a first increase thereof after its start, to discharge across said generator when the motor speed thereafter decreases from said maximum speed to a slower operational speed, and to be charged again, when the motor speed thereafter undergoes a repeated increase from a given operational speed, across said control circuit so as to apply said control voltage thereto and to render said amplifier means conductive whenever such repeated speed increase beyond the operational speed existing before such increase occurs, whereby through energization of said exciter winding by said voltage the motor is returned to the operational speed existing before said repeated increase thereof.

3. A control arrangement for a direct current motor having at least one separate-exciter winding and driving a take-up reel, for automatically regulating the motor speed in reverse proportion to the increase of the diameter of the coil of material being reeled, and for automatically maintaining the motor at its previously regulated speed existing when the load on the motor disappears, particularly in the case of a break of the material being reeled, comprising, in combination, first circuit means supplying direct current to the motor armature and including first resistance means developing a voltage drop thereacross varying in proportion with the load current of the motor which current varies with the change of the diameter of the material coil being reeled; second circuit means including a source of predetermined voltage for energizing the separate-exciter winding and including second resistance means permitting only a fraction of said voltage to be applied to said exciter winding, and controllable amplifier means including a control circuit and being connected in parallel with said second resistance means, said amplifier means being changeable between a substantially non-conductive condition in which said second resistance means is rendered effective, and a second conductive and amplifying condition in which said second resistance means is shunted and said voltage is applied in amplified form to said exciter winding; comparator circuit means connected between said control circuit of said amplifier means and said first resistance means and including a source of reference voltage and potentiometer means for adjusting said reference voltage to a desired value, for comparing said adjusted reference voltage with said voltage drop across said first resistance means and for applying an existing voltage difference therebetween as said control voltage to said control circuit of said amplifier means so as to render the latter conductive as long as said voltage drop exceeds said reference voltage; generator means coupled with the motor for producing an output voltage in proportion to the motor speed; auxiliary circuit means connected between the output of said generator and said control circuit of said amplifier means and including capacitor means arranged to be charged by said output voltage in proportion to a maximum motor speed reached upon a first increase thereof after its start, to discharge across said generator when the motor speed thereafter decreases from said maximum speed to a slower operational speed, and to be charged again, when the motor speed thereafter undergoes a repeated increase from a given operational speed, across said control circuit so as to apply said control voltage thereto and to render said amplifier means conductive whenever such repeated speed increase beyond the operational speed existing before such increase occurs, whereby through energization of said exciter winding by said amplified voltage the motor is returned to the operational speed existing before said repeated increase thereof.

4. A control arrangement for a direct current motor having at least one separate-exciter winding and driving a take-up reel, for automatically regulating the motor speed in reverse proportion to the increase of the diameter of the coil of material being reeled, and for automatically maintaining the motor at its previously regulated speed existing when the load on the motor disappears, particularly in the case of a break of the material being reeled, comprising, in combination, first circuit means supplying direct current to the motor armature and including a series-exciter winding and first resistance means forming together a series-combination developing a voltage drop thereacross varying in proportion with the load current of the motor which current varies with the change of the diameter of the material coil being reeled; second circuit means including a source of predetermined voltage for energizing the separate-exciter winding and including second resistance means permitting only a fraction of said voltage to be applied to said exciter winding, and controllable amplifier means including a control circuit and being connected in parallel with said second resistance means, said amplifier means being changeable between a substantially non-conductive condition in which said second resistance means is rendered effective, and a second conductive and amplifying condition in which said second resistance means is shunted and said voltage is applied in amplified form to said exciter winding; comparator circuit means connected between said control circuit of said amplifier means and said series-combination and including a source of reference voltage and potentiometer means for adjusting said reference voltage to a desired value, for comparing said adjusted reference voltage with said voltage drop across said series-combination and for applying an existing voltage difference therebetween as said control voltage to said control circuit of said amplifier means so as to render the latter conductive as long as said voltage drop exceeds said reference voltage; generator means coupled with the motor for producing an output voltage in proportion to the motor speed; auxiliary circuit means connected between the output of said generator and said control circuit of said amplifier means and including capacitor means arranged to be charged by said output voltage in proportion to a maximum motor speed reached upon a first increase thereof after its start, to discharge across said generator when the motor speed thereafter decreases from said maximum speed to a slower operational speed, and to be charged again, when the motor speed thereafter undergoes a repeated increase from a given operational speed, across said conrtol circuit so as to apply said control voltage thereto and to render said amplifier means conductive whenever such repeated speed increase beyond the operational speed existing before such increase occurs, whereby through energization of said exciter winding by said amplified voltage the motor is returned to the operational speed existing before said repeated increase thereof.

5. A control arrangement for a direct current motor having at least one separate-exciter winding and driving a take-up reel, for automatically regulating the motor speed in reverse proportion to the increase of the diameter of the coil of material being reeled, and for automatically maintaining the motor at its previously regulated speed existing when the load on the motor disappears, particularly in the case of a break of the material being reeled, comprising, in combination, first circuit means supplying direct current to the motor armature and including first resistance means developing a voltage drop thereacross varying in proportion with the load current of the motor which current varies with the change of the diameter of the material coil being reeled; second circuit means including a source of predetermined voltage for energizing the separate-exciter winding and including second resistance means permitting only a fraction of said voltage to be applied to said exciter winding, and controllable amplifier means including a control circuit and being connected in parallel with said second resistance means, said amplifier means being changeable between a substantially non-conductive condition in which said second resistance means is rendered effective, and a second conductive and amplifying condition in which said second resistance means is shunted and said voltage is applied in amplified form to said exciter winding; comparator circuit means connected between said control circuit of said amplifier means and said first resistance means and including a source of predetermined reference voltage, for comparing said reference voltage with said voltage drop across said first resistance means and for applying an existing voltage difference therebetween as said control voltage to said control circuit of said amplifier means so as to render the latter conductive as long as said voltage drop exceeds said reference voltage; generator means coupled with the motor for producing an output voltage in proportion to the motor speed; auxiliary circuit means connected between the output of said generator and said control circuit of said amplifier means and including capacitor means arranged to be charged by said output voltage in proportion to a maximum motor speed reached upon a first increase thereof after its start, to discharge across said generator when the motor speed thereafter decreases from said maximum speed to a slower operational speed, and to be charged again, when the motor speed thereafter undergoes a repeated increase from a given operational speed, across said control circuit so as to apply said control voltage thereto and to render said amplifier means conductive whenever such repeated speed increase beyond the operational speed existing before such increase occurs, whereby through energization of said exciter winding by said amplified voltage the motor is returned to the operational speed existing before said repeated increase thereof.

6. An arrangement as claimed in claim 5 including diode means connected between one output terminal of said generator and one terminal of said capacitor means having, when the latter is charged, the same polarity as said one output terminal, for preventing said capacitor from being charged across said diode means, while permitting discharge of said capacitor means across said generator when the output voltage thereof is lower than the charge potential of said capacitor means, and normally open switch means connected in parallel with said diode means for shunting said diode means temporarily by closing said switch means while said motor is started and accelerated to its maximum initial speed so that said capacitor means are charged by said generator during this period, said control circuit of said amplifier means being connected in parallel with said diode means.

7. A control arrangement for a direct current motor having at least one separate-exciter winding and driving a take-up reel at speeds decreasing with the increase of the diameter of the coil of material being reeled, for automatically maintaining the motor at its speed existing when a previously existing load on the motor disappears, particularly in the case of a break of the material being reeled, comprising, in combination, circuit means including a source of predetermined voltage for energizing the separate-exciter winding and including resistance means permitting only a fraction of said voltage to be applied to said exciter winding, and controllable amplifier means including a control circuit and being connected in parallel with said resistance means, said amplifier means being changeable, by application of a control voltage to said control circuit, between a first substantially non-conductive condition in which said resistance means are rendered effective, and a second conductive and amplifying condition in which said resistance means are shunted and said voltage is applied in amplified form to said exciter winding; generator means coupled with the motor for producing an output voltage in proportion to the motor speed; auxiliary circuit means connected between the output of said generator and said control circuit of said amplifier means and including capacitor means arranged to be charged by said output voltage in proportion to a maximum motor speed reached upon a first increase thereof after its start, to discharge across said generator when the motor speed thereafter decreases from said maximum speed to a slower operational speed, and to be charged again, when the motor speed thereafter undergoes a repeated increase from a given operational speed, across said control circuit so as to apply said control voltage thereto and to render said amplifier means conductive whenever such repeated speed increase beyond the operational speed existing before such increase occurs, whereby through energization of said exciter winding by said amplified voltage the motor is returned to the operational speed existing before said repeated increase thereof; and diode means connected between one output terminal of said generator and one terminal of said capacitor means having, when the latter is charged, the same polarity as said one output terminal, for preventing said capacitor from being charged across said diode means, while permitting discharge of said capacitor means across said generator when the output voltage thereof is lower than the charge potential of said capacitor means, and normally open switch means connected in parallel with said diode means for shunting said diode means while said motor is started and accelerated to its maximum initial speed so that said capacitor means are charged by said generator during this period, said control circuit of said amplifier means being connected in parallel with said diode means.

References Cited in the file of this patent
UNITED STATES PATENTS

| | | |
|---|---|---|
| 2,437,140 | Waldie | Mar. 2, 1948 |
| 2,504,155 | Roman | Apr. 18, 1950 |
| 2,512,378 | Puchlowski | June 20, 1950 |
| 2,600,303 | Koralsky | June 10, 1952 |